US006981652B2

(12) United States Patent
Lin

(10) Patent No.: US 6,981,652 B2
(45) Date of Patent: Jan. 3, 2006

(54) WATER FOUNTAIN WITH MULTIPLE WATER PUMPS

(76) Inventor: Chung-Kuei Lin, 6F-4, No. 1, Wuchuan 1st Rd., Wuku Industrial Dist., Hsinchuang City, Taipei Hsien (TW)

( * ) Notice: Subject to any disclaimer, the term of this patent is extended or adjusted under 35 U.S.C. 154(b) by 170 days.

(21) Appl. No.: 10/734,190

(22) Filed: Dec. 15, 2003

(65) Prior Publication Data

US 2005/0129546 A1 Jun. 16, 2005

(51) Int. Cl.
*G03B 9/20* (2006.01)
*B05B 17/08* (2006.01)
*F21S 8/00* (2006.01)

(52) U.S. Cl. ............................ 239/17; 239/16; 239/18; 239/22; 239/23

(58) Field of Classification Search .................. 239/17, 239/16, 18, 22, 23

See application file for complete search history.

(56) References Cited

U.S. PATENT DOCUMENTS

| | | | | |
|---|---|---|---|---|
| 2,888,205 A * | 5/1959 | Trucco | ........................ | 239/20 |
| 3,702,172 A * | 11/1972 | Hawkins | ...................... | 239/18 |
| 4,705,216 A * | 11/1987 | Kaffka et al. | ................. | 239/18 |
| 6,416,197 B1 * | 7/2002 | Chang | ......................... | 362/96 |
| 6,843,428 B2 * | 1/2005 | Wooten et al. | ................ | 239/20 |

* cited by examiner

*Primary Examiner*—Davis Hwu
(74) *Attorney, Agent, or Firm*—Hershkovitz & Associates; Abe Hershkovitz

(57) ABSTRACT

A water fountain includes a basin, multiple water pumps in the space of the basin for pumping the water in the space, an annular disk securely supported by an inner face of the basin and having a centrally defined hole and multiple through holes in communication with the outlets of each of the water pumps via pipes such that water pumped by the water pumps is able to be ejected out of the annular disk from the through holes, a sphere securely supported by a periphery defining the hole of the annular disk and a light emitting diode assembly received in the hole of the annular disk for emitting colorful light beams. A circuit board is sandwiched between a bottom of the basin and a cap for providing electricity to the water pumps and the light emitting diode assembly.

2 Claims, 4 Drawing Sheets

WATER FOUNTAIN WITH MULTIPLE WATER PUMPS

BACKGROUND OF THE INVENTION

1. Field of the Invention

The present invention relates to a water fountain, and more particularly to a water fountain with multiple water pumps to eject water out such that mixing of waterspouts with colorful light beams emitted by light emitting diodes enriches the surrounding atmosphere.

2. Description of Related Art

A conventional fountain usually is equipped with a water pump to pump water from a reservoir so that the waterspouts are able to be ejected to form an eye-catching scene. However, because the strength of the single water pump is not sufficient to eject the waterspouts to a certain height, the decorative effect is not enough. Furthermore, the elementary waterspouts quickly lose attraction to people nearby.

To overcome the shortcomings, the present invention tends to provide an improved water fountain to mitigate the aforementioned problems.

SUMMARY OF THE INVENTION

The primary objective of the present invention is to provide an improved water fountain with multiple water pumps such that the waterspouts can be ejected to a certain height to enrich the decorative effect.

Another objective of the present invention is to provide a light emitting diode assembly so that colorful light beams are able to mix with the waterspouts to increase the decorative effect.

Other objects, advantages and novel features of the invention will become more apparent from the following detailed description when taken in conjunction with the accompanying drawings.

DETAILED DESCRIPTION OF THE PREFERRED EMBODIMENT

Figure 1:
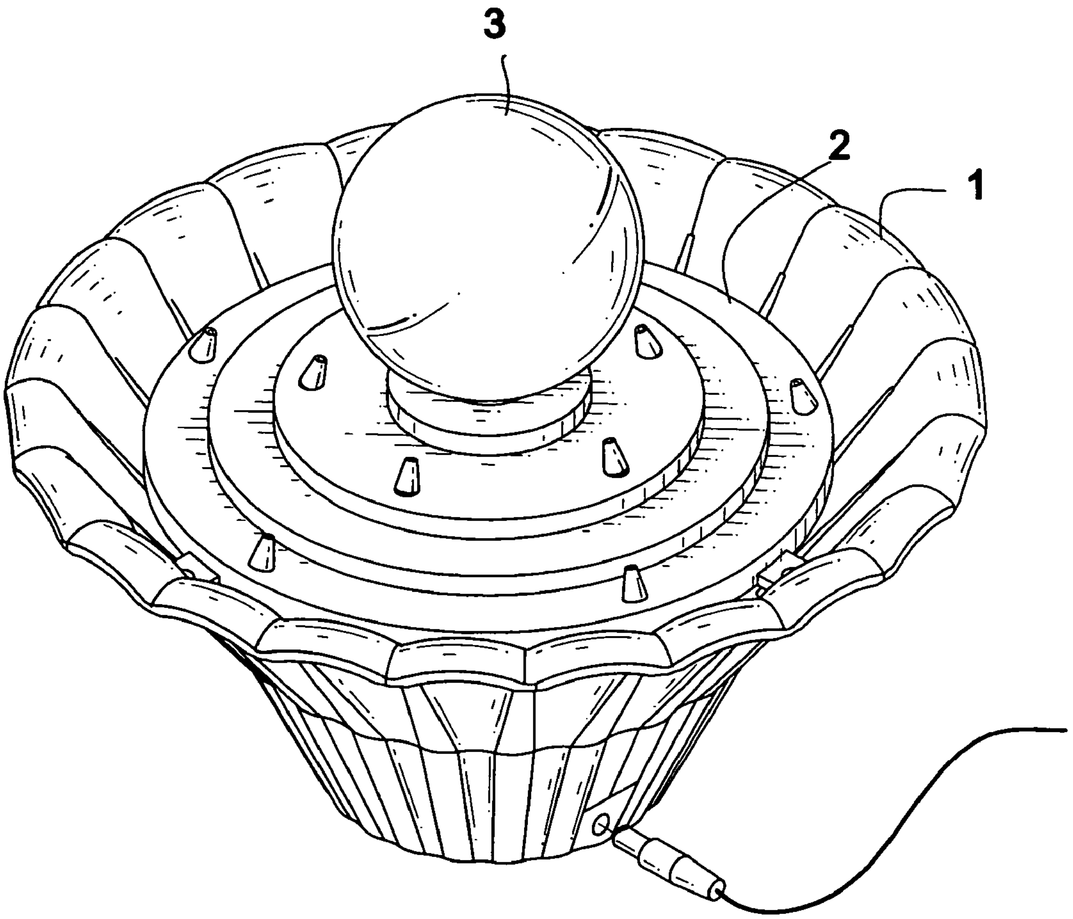
FIG. 1 is a perspective view of the water fountain of the present invention.

With reference to FIG. 1, the water fountain in accordance with the present invention has a basin (1), an annular disk (2) and a sphere (3).

Figure 2:
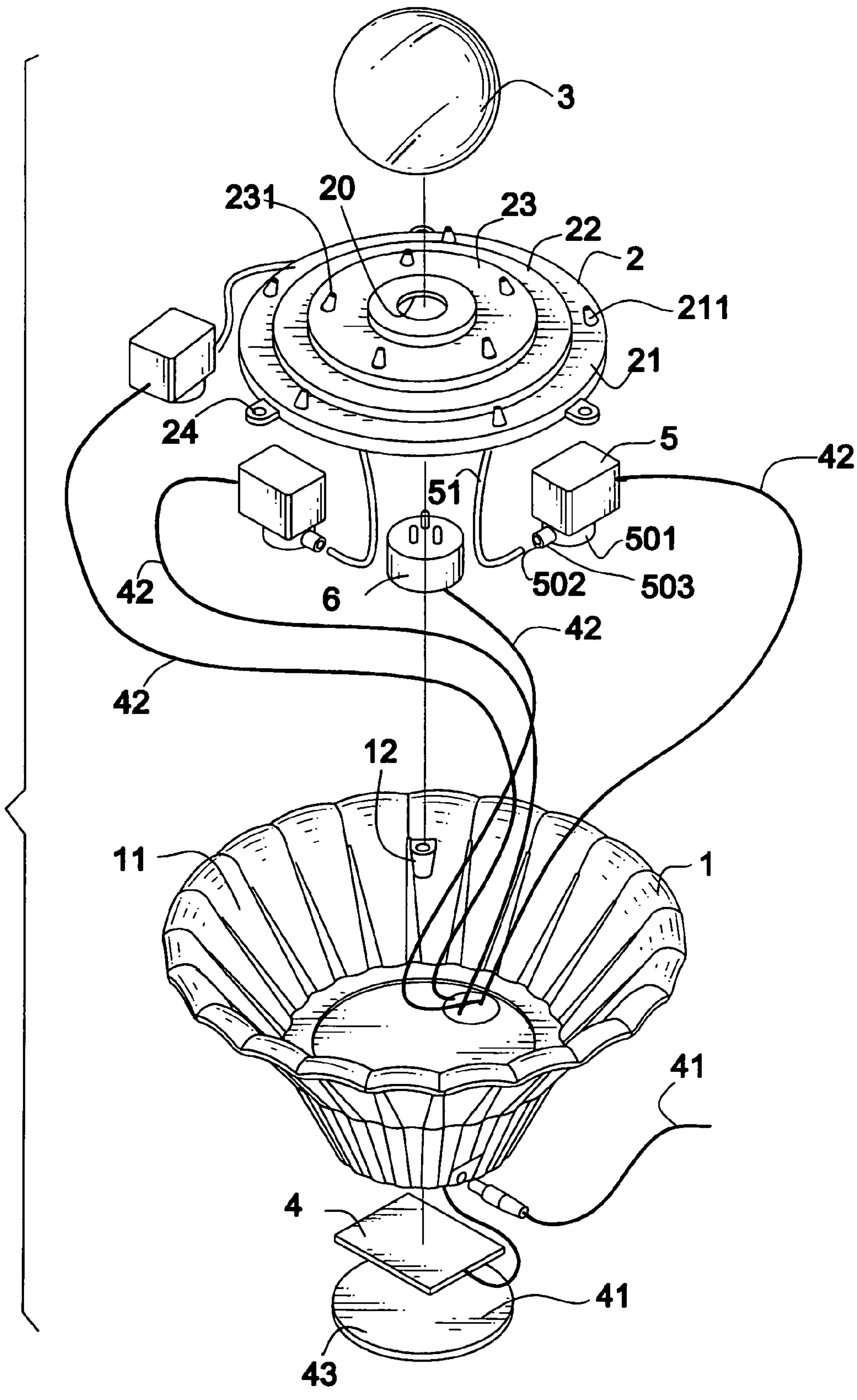
FIG. 2 is an exploded perspective view of the water fountain in FIG. 1.

With reference to FIG. 2, the basin (1) has a space (11) defined therein for receiving water and has fixing plates (12) (only one is shown) securely formed on an inner face of the basin (1). It is noted that the basin (1) further has a secondary compartment (13) defined adjacent to and separated from the space (11) by a baffle (not numbered).

The annular disk (2) has a centrally defined hole (20), multiple steps (21,22,23) and the steps (21,22, 23) respectively have multiple through holes (211,221,231) defined through the respective step (21,22,23). Each through hole (211,221,231) has a specific angle configured in such a manner that a longitudinal axis of each through hole (211, 221, 231) extends through a center of the annular disk (2). Multiple securing rings (24) are peripherally formed on the annular disk (2) to correspond to the fixing plates (12).

A circuit board (4) is received in the secondary compartment (13) and attached to a bottom of the secondary compartment (13) of the basin (1) and is electrically connected to a power line (41) which in turn is connected to multiple wires (42). In this embodiment, three wires (42) are connected to three water pumps (5) respectively and another wire (42) is connected to a light emitting diode assembly (6) corresponding to the hole (20) of the annular disk (2). A cap (43) is provided to the bottom of the basin (1) to sandwich the circuit board (4).

Figure 3:
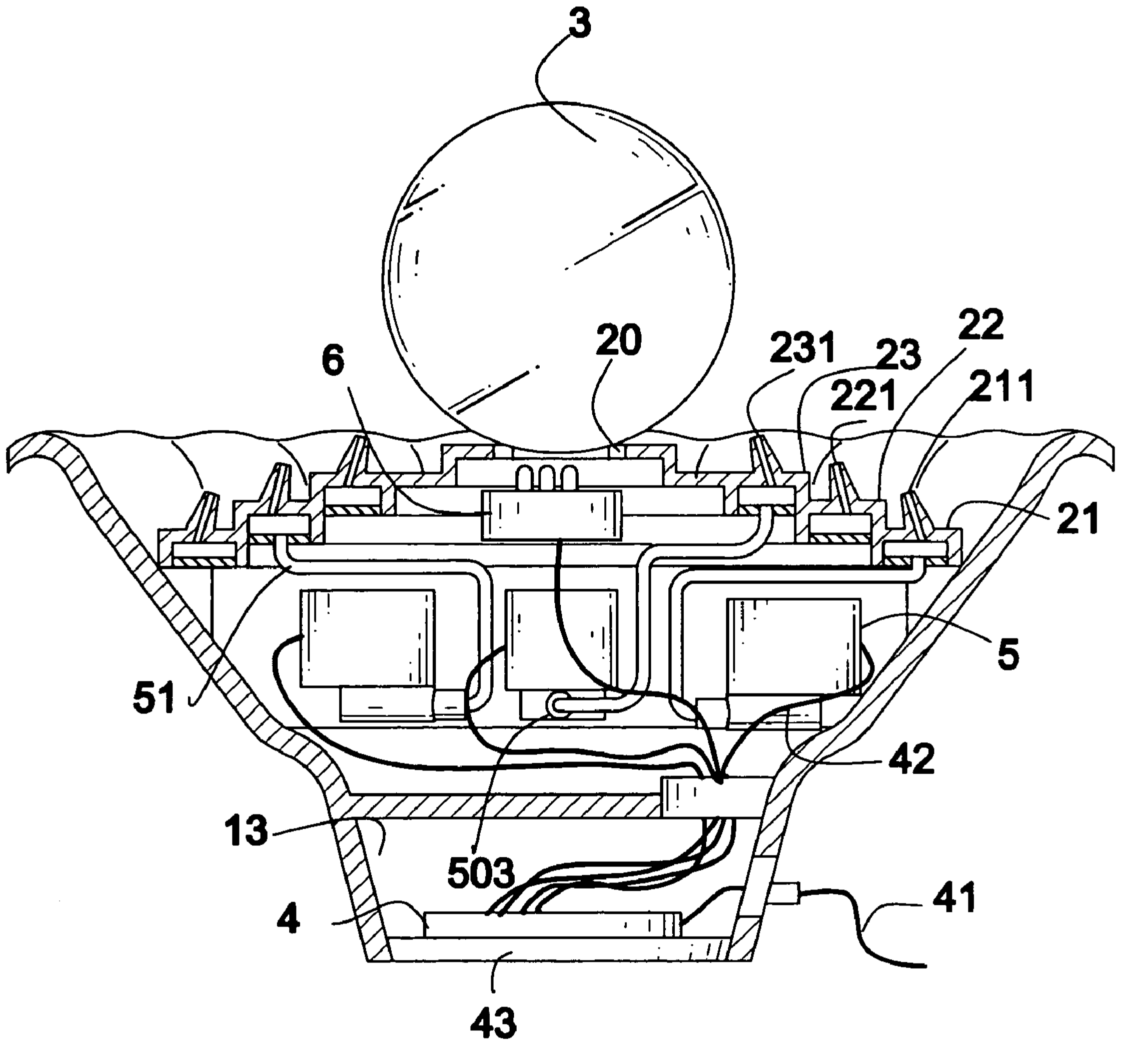
FIG. 3 is a cross sectional view of the water fountain in FIG. 1.

With reference to FIG. 3, when the water fountain of the present invention is assembled, it is noted that the circuit board (4) is sandwiched between the cap (43) and the bottom of the basin (1) and the power line (41) in electrical connection with the circuit board (4) extends out of the basin (1) for connection with a power source. The power wires (42) extending from the circuit board (4) are respectively connected to the multiple water pumps (5) each having an inlet (501) in communication with the space (11) of the basin (1) and an outlet (502) in connection with the through holes (211,231) of the annular disk (2) via a pipe (51). Engagement between the fixing plates (12) and the securing rings (24) may be accomplished by means of screws, bolts or the like to secure the engagement therebetween. The sphere (3) is supported by a periphery defining the hole (20) of the annular disk (2).

Preferably, the sphere (3) is made of a transparent or translucent material and the light emitting diode assembly (6) is received in the hole (20).

Figure 4:
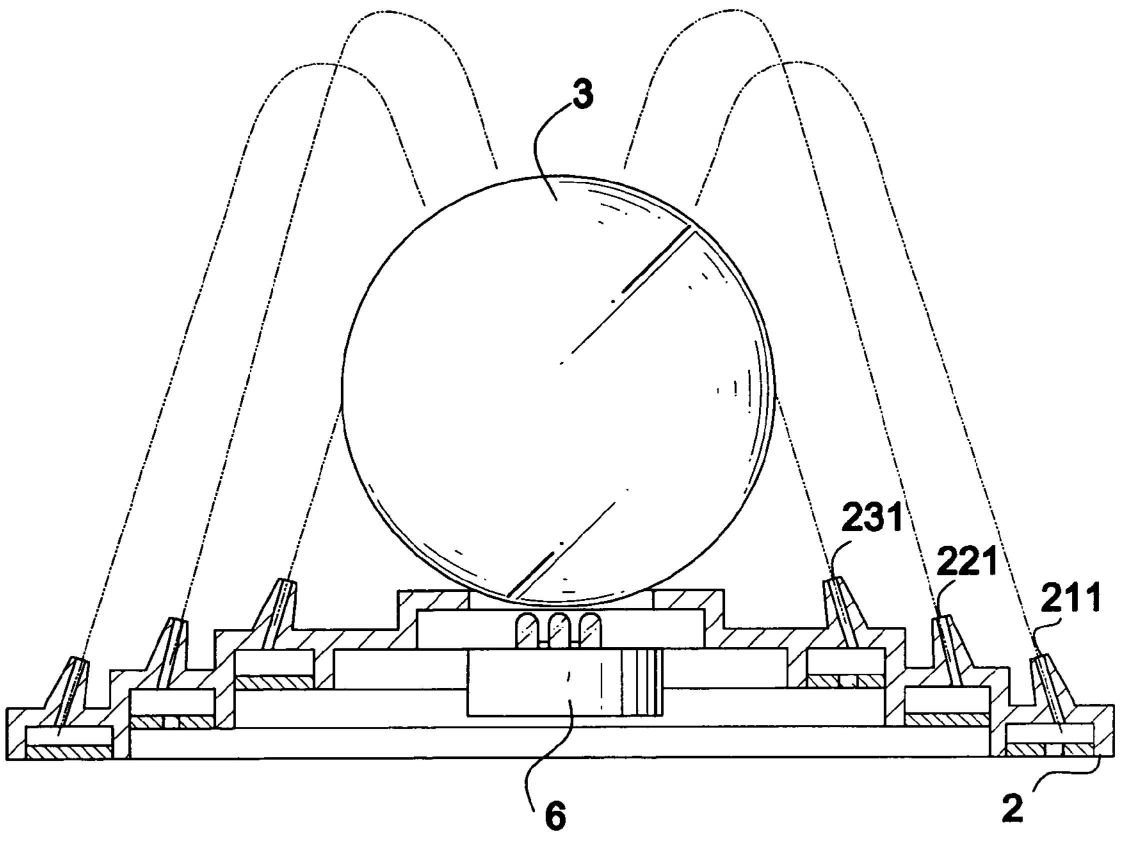
FIG. 4 is a schematic view showing that the waterspouts are ejected to be mixed with colorful light beams.

With reference to FIG. 4, when the water fountain of the present invention is activated, the water pumps (5) pump water from the space (11) of the basin (1) to eject waterspouts from the through holes (211,221,231) of the annular disk (2). Through the predetermined control of the circuit board (4), the waterspouts from the through holes (231) regularly eject out of the annular disk (2) to form different patterns. Thus a decorative effect, "water dancing", of the invention is obvious. Meanwhile, the light beams from the light emitting diode assembly (6) extend through the lucid sphere (3). Because the longitudinal axis of each through hole (211,221,231) extends through the center of the annular disk (2), the waterspouts are ejected into the air and then fall to the outer periphery of the sphere (3). With the colorful light beams from the light emitting diode assembly (6) and the water on the outer periphery of the sphere (3), the decorative result of the present invention is very effective. It is noted that, preferably, a unidirectional valve (503) is mounted on the outlet (502) of the water pump (5) to prevent water on the annular disk (2) from flowing back to the outlet (502) of the water pump (5). Thus waterspouts are able to be steadily ejected without worry about the air mixing with the water and thus causing unsteady water ejection.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A water fountain comprising:

a basin defined with a space for receiving water therein and a secondary compartment separated from the space by a baffle;

multiple water pumps received in the space of the basin for pumping the water in the space and each water pump having an inlet in communication with the space and an outlet;

an annular disk securely supported by an inner face of the basin and having a centrally defined hole, multiple through holes in communication with the outlets of each of the water pumps via pipes such that water pumped by the water pumps is able to be ejected out of the annular disk from the through holes;

a sphere securely supported by a periphery defining the hole of the annular disk;

a light emitting diode assembly received in the hole of the annular disk for emitting colorful light beams;

a circuit board sandwiched between a bottom of the basin and a cap to be received in the secondary compartment of the basin, the circuit board having a power line extending out of the basin for connection with a power source and wires in connection with the power source and providing electricity to the water pumps and the light emitting diode assembly.

2. The water fountain as claimed in claim 1, wherein the annular disk has multiple securing rings formed on an outer periphery of the annular disk and the basin has multiple fixing plates formed on an inner periphery of the basin to correspond to the securing rings so that the annular disk is able to be securely supported by the basin.

* * * * *